Aug. 10, 1965 J. S. CUBERT 3,200,267

PULSE GENERATOR AND SHAPER EMPLOYING TWO CHARGE-STORAGE DIODES

Filed April 4, 1963 2 Sheets-Sheet 1

INVENTOR
JACK SAUL CUBERT

BY J. Donald Weber
AGENT

United States Patent Office 3,200,267
Patented Aug. 10, 1965

3,200,267
PULSE GENERATOR AND SHAPER EMPLOYING TWO CHARGE-STORAGE DIODES

Jack Saul Cubert, Willow Grove, Pa., assignor to Sperry Rand Corporation, New York, N.Y., a corporation of Delaware Filed Apr. 4, 1963, Ser. No. 270,578
6 Claims. (Cl. 307—88.5)

This invention relates to a pulse generating and shaping network. In particular, the circuit is utilized to shape or reform the leading and/or trailing edges of electrical signals.

In many electrical circuits, as for example those used in digital computers and similar devices utilizing information in the form of electrical pulses, there are many occasions and/or great necessity for the reformation and reshaping of the signals or pulses utilized thereby. That is, signals may be generated by any type of conventional signal supplying or generating circuit. However, after these signals have passed through a circuit or a plurality of cascaded circuits which utilize these signals, the signals may become radically deformed. The deformation may be evidenced by the fact that the leading or trailing edges of the signals generated by the signal generating circuit may originally have been sharply defined edges which are indicative of high-speed or fast rise and fall-times for the signals. After extensive utilization of the signals by various types of circuits, certain delays or other deforming actions are produced and have a deleterious effect on the signals. That is, the leading and trailing edges of the signals may have substantially slow-speed rise and fall-times. Thus, instead of the level shift in the signal taking place almost instantaneously (perhaps on the order of 0.2 nanosecond and the like) these leading and trailing edges and the changes in the signal level may take on the order of 10 to 50, or more, nanoseconds. Therefore, it is necessary to provide circuits which will reshape and reform these signals.

The instant invention suggests at least two embodiments of pulse forming and/or shaping networks which utilize snap-action or stored-charge diodes. In one embodiment of the invention, the snap-action of the stored-charge diode provides a high speed switching operation whereby a signal, the leading edge of which has an extremely fast rise-time, is produced. In another embodiment, a plurality of stored-charge diodes are utilized such that the snap-action switching thereof occurs at different times. The separate switching actions provide the high speed leading and trailing edges for a signal whereby a signal having a fixed pulse length, as well as high speed rise and fall times, is obtained.

Therefore, it is one object of this invention to provide a fast-rise-time pulse-forming network.

Another object of this invention is to provide a pulse forming and generating circuit which produces pulses with fast rise and fast fall times.

Another object of this invention is to provide a pulse generator which is relatively uncomplicated and which requires few components.

Another object of this invention is to provide a pulse generator circuit which produces a pulse having a fast rise time in response to an input pulse having a relatively slow rise time.

Another object of this invention is to provide a pulse generator circuit which produces a pulse having both fast rise and fast fall times in response to an input pulse whose rise and fall times are relatively slow.

Another object of this invention is to provide a pulse generator circuit which produces one reshaped pulse for each input signal applied thereto.

These and other objects and advantages of this invention will become more readily apparent when the following description is read in conjunction with the attached drawings, in which.

Figure 1:
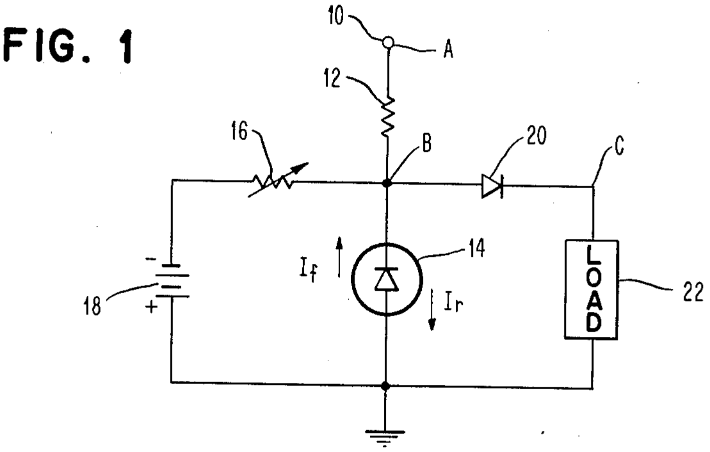
FIGURE 1 is a schematic diagram of one embodiment of this invention, which embodiment provides a signal having fast rise time.

In the figures attached hereto, similar components bear similar reference numerals. Referring now to FIGURE 1, it may be seen that an input source 10 is connected to one terminal of resistor 12. The input source 10 may be any conventional source capable of supplying any variable signal having at least two different potential levels. In the preferred embodiment, the input signal is in the form of a substantially rectangular pulse which has a peak magnitude of approximately +5 volts. This peak magnitude is measured with reference to the base potential of the signal supplied by source 10 which may be on the order of ground potential. Of course, the potential suggested may be altered in accordance with specific utilizations of the circuit and may exceed +20 volts even with presently available storage diodes. For example, if the output signal required by the load 22 must be larger than +20 volts, the input signal supplied by source 10 would be commensurately greater. Furthermore, the base potential of the signal supplied by input source 10 may be reduced to a negative potential if, in fact, this is necessary in order to provide efficient forward current flow through diode 14. However, for the preferred embodiment discussed, the signal potentials are those indicated.

Resistor 12, which may be on the order of 50 ohms, has another terminal thereof connected to the common junction B. It is to be understood, of course, that resistor 12 may represent the impedance of source 10. The common junction B is connected to the cathode of diode 14. The anode of diode 14 is connected to ground or some potential source which is capable of supplying a substantially constant potential. Diode 14 is a stored-charge diode, as, for example, a General Electric CSD 686 type diode, which is characterized by the ability to store charge in the lattice structure thereof. This charge is stored in response to a forward current flow therethrough and permits a reverse current to flow in the diode when it is reverse biased. The reverse current continues until all of the minority current carriers have been swept out of the lattice structure of the diode. This type of diode operation has been described in the art and is frequently called "enhancement."

One terminal of resistor 16 is connected to the common junction B. Another terminal of resistor 16, which may be on the order of 100 ohms, is connected to the negative terminal of source 18 which is shown as a battery for convenience only. Source 18 may be any conventional type of source including a unipolar source which is capable of supplying a substantially constant potential on the order of 10 volts. The positive terminal of source 18 is connected to the anode of diode 14. The shunt branch comprising resistor 16 and source 18 is used to provide forward current in diode 14 in order to store charge therein. As will become evident subsequently, it is important to regulate the switching time of the diode 14. The switching time of diode 14 is a function of the charge stored therein. Moreover, the charge stored in the diode is a function of the forward current which flows therethrough. In order to regulate the charge stored in the diode 14, and therefore, the switching time of the diode, either resistor 16 or source 18 may be variable. For purposes of convenience, resistor 16 has been shown as being variable in this case. However, this is not meant to limit the scope of the invention in any manner. For example, an inductor (not shown) may be inserted in series with, or in lieu of, resistor 16 for power limiting purposes.

Also connected to the common junction B is the anode of diode 20. Diode 20 may be any type of rectifier diode, as for example, an FD 600 or ID 5–050 type diode. Diode 20 must exhibit high speed switching and high conducting characteristics as well as little or no charge storing capabilities. The cathode of diode 20 is connected to one terminal of load 22. Another terminal of load 22 is returned to the anode of diode 14 or ground potential, unless, of course, it is desirable to apply a bias potential to load 22 relative to the potential at the anode of diode 14. Load 22 is shown in block form inasmuch as the load may comprise a resistive load or any other type of load which is desirable, including a non-linear load. Furthermore, load 22 may, in fact, comprise a plurality of load networks and is not meant to be limited to a single load.

Figure 2:
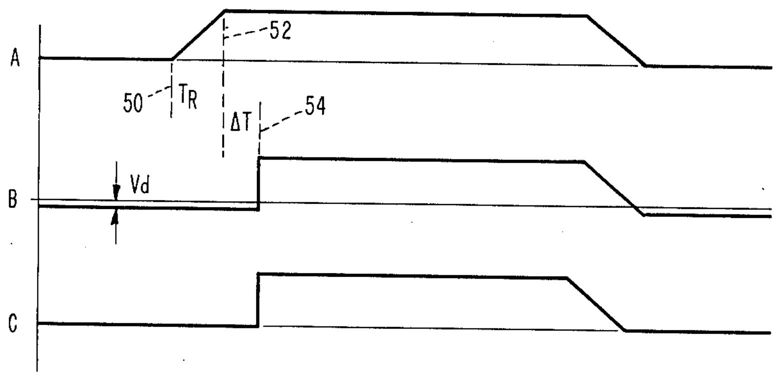
FIGURE 2 is an idealized diagram of the waveforms of the signals provided by the circuit of FIGURE 1.

The operation of the circuit of FIGURE 1 is described by making concurrent reference to FIGURE 2. In FIGURE 2, the waveforms labeled A, B and C are the waveforms which are observed at the locations A, B and C in FIGURE 1. Thus, it will be seen that the signal supplied by source 10 and observed at terminal A is initially a low level signal. The signal switches to a high level signal, remains as such for some time period and then returns to the low level signal. The magnitude and the duration of the signal shown on line A of FIGURE 2 are examples only and are not meant to limit the invention in any manner. In the waveform shown on line A of FIGURE 2, the rise time is designated $T_R$. The time duration $T_R$ is shown between the dashed lines 50 and 52 which represent projections from the break-points in the curve shown on line A of FIGURE 2. The signal supplied by source 10 is transmitted via resistor 12 to junction B. However, because of the biasing network comprising battery 18 and resistor 16, junction B is at a low level potential, for example about —750 millivolts. That is, the potential divider network comprising resistors 12 and 16 between sources 10 and 18 tends to provide a negative potential at junction B when input signal A is at the low level or ground potential. Therefore, a forward current, or $I_f$, exists in the diode 14 whereby the potential at junction B is substantially equal to ground potential less the voltage drop which is exhibited across diode 14. Thus, for example if the forward voltage drop across diode 14 is approximately 750 millivolts, the potential at junction B is approximately —750 millivolts. The remainder of the potential supplied by source 18 is dropped across resistor 16. Thus, it may be seen that on line B of FIGURE 2 the potential at junction B is initially $-V_d$.

When the input signal supplied by source 10 reaches the breakpoint represented by dashed line 50, the potential at terminal A begins to rise. Initially, this rise in potential at terminal A merely creates a larger current in the circuit comprising resistors 12 and 16 and source 18 because diode 14 presents a substantially constant potential drop thereacross. However, when the potential at terminal A has reached the level whereby the potential dividing effect across resistors 12 and 16 is such that the potential at junction B has a magnitude which causes reverse biasing of diode 14, a reverse current flows therethrough. This condition will normally occur during the time period $T_R$. When diode 14 is conducting a reverse current, the reverse impedance thereof is almost negligible. Therefore, diode 14 appears virtually as a short circuit shunt across the circuit and the potential at junction B remains substantially at the level $-V_d$. In practice, the potential at junction B will tend to rise slightly toward ground potential. At a time $\Delta T$ after the application of the reverse biasing signal to the diode 14, the charge stored in the diode is completely removed. At this point (see dashed line 54 on line B of FIGURE 2), diode 14 ideally, becomes an open circuit and the reverse current therein ceases. Therefore, the potential at junction B rises sharply. This rise can be completed in a time period on the order of 0.2 to 0.5 nanosecond or even less, depending upon the diode. The potential at junction B rises to the potential which is presented by the voltage dividing effect of resistors 12 and 16 which are connected between the sources 10 and 18. When the diode 14 ceases reverse conduction, it remains as an open circuit and the potential at junction B then continues to follow the potential waveform presented by the source 10 at terminal A. Observing line B of FIGURE 2, it will be seen that after the leading edge (represented by dashed line 54) of the signal produced at junction B, the signal at junction B is identical, in configuration, to the signal at junction A.

It should be observed, however, that with the termination of the signal shown on line A of FIGURE 2, the potential at junction B falls to the potential of $-V_d$ as described supra. That is, with the removal of the signal A supplied by source 10, forward current again exists in storage diode 14.

Initially, the potential at point C of FIGURE 1 and shown on line C of FIGURE 2, is effectively ground inasmuch as there is no initial current flow at the point of the circuit since diode 20 is reverse biased. With the application of the input signal A applied by source 10, diode 14 eventually switches, such that the potential at junction B rises sharply. Since diode 20 is a high-conduction high-speed diode, the high potential at junction B is produced at point C. Moreover, the potential waveform at point C will follow and be substantially identical to the potential waveform at junction B. However, when the input signal A supplied by source 10 ceases, the potential at junction B is reduced to $-V_d$ whereby rectifier diode 20 is reverse biased and cut off. Therefore, the potential at point C returns to ground potential as described supra.

Thus, it may be seen that an input signal having a "sloppy" leading edge, i.e., a leading edge which has a very slow rise time and perhaps a poor waveshape, has been reformed by this circuit to provide a signal having a very fast rise time and a sharp, steep waveshape. Thereafter, the output signal, shown on line C of FIGURE 2, is substantially identical to the output signal shown on line A of FIGURE 2 with the exception that because of attenuation, the magnitude of the signals may be different.

Figure 3:
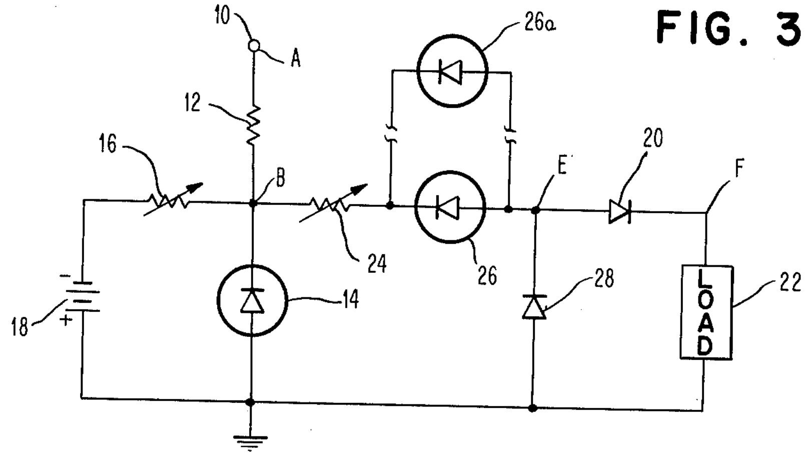
FIGURE 3 is another embodiment of this invention, which embodiment provides a pulse having a fixed duration and having fast rise and fall times.

Referring now to FIGURE 3, there is shown a schematic diagram of another embodiment of this invention. In this embodiment of the invention, components which are similar to those shown in FIGURE 1 bear similar reference numerals. Thus, input source 10 is connected to the potential dividing network comprising resistors 12 and 16 and source 18. Again, the storage diode 14 is connected in parallel with the resistor 16 and source 18 whereby forward current, $I_f$, is selectively produced. Connected to the common junction B, which is the junction between resistor 16, resistor 12 and the cathode of diode 14, is one terminal of resistor 24. For convenience, resistor 24 is shown as a variable resistance in order to permit control of the forward current through diodes 26 (and **26*a*) as will appear subsequently. Moreover, resistor 24 provides an impedance (or potential) level difference between diodes 14 and 26. Another terminal of resistor 24 which may have a resistance on the order of 10 ohms is connected to the cathode of storage diode 26 which may be similar to diode 14. The anode of diode 26 is connected to the common junction E. Connected to the common junction E is the cathode of diode 28 which has the anode thereof connected to the anode of storage diode 14 and returned to ground potential unless, of course, it is desirable to provide a bias potential at the anode of diode 28. Diode 28 may be similar to diode 20 in its characteristics. The anode of diode 20 is connected to junction E, and has the characteristics attributed to diode 20 in FIGURE 1. The cathode of diode 20 is connected to junction F which is represented by one terminal of load 22. Another terminal of load 22 is returned to ground potential or other bias source. It is contemplated that one or more storage diodes similar to storage diode 26 and represented by the additional diode 26***a* may be connected in parallel with the storage diode 26. These additional diodes have the effect of varying the recovery time of the storage diode such that the duration of the output pulse may be varied.

Figure 4:
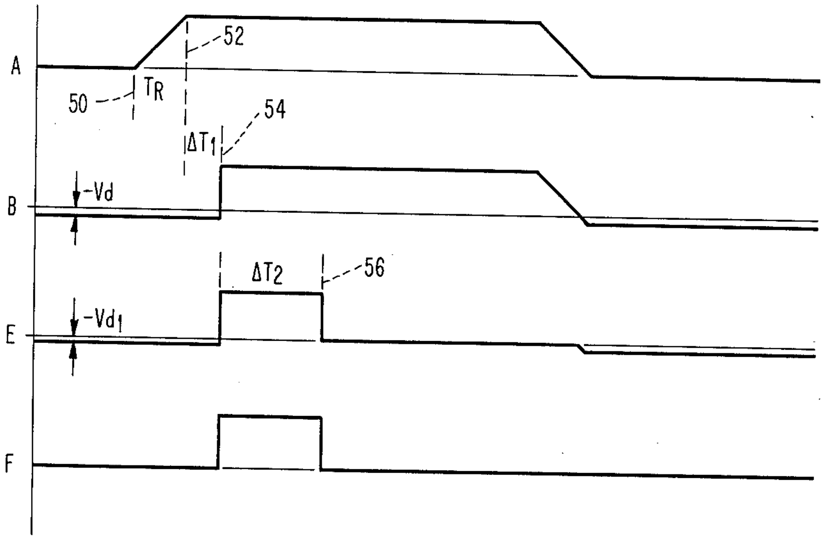
FIGURE 4 is an idealized diagram of the waveforms produced by the circuit of FIGURE 3.

In describing the operation of the circuit of FIGURE 3, concurrent reference is made to FIGURE 4. In FIGURE 4, the waveforms labeled A, B, E and F coincide with the waveforms observed at the locations with the literal designations shown in the circuit configuration of FIGURE 3. The waveforms shown on lines A and B of FIGURE 4 are identical to those shown in the lines A and B of FIGURE 3 and are obtained in a like manner. However, it should be observed that while there was forward current, $I_f$, in diode 14, a parallel current path was provided which included rectifier diode 28, storage diode 26 and resistor 24. Thus, charge was stored in the storage diode 26 as well as in storage diode 14. The charge stored in diode 26 is regulated as a function of the current therethrough which current is a function of the impedance of resistor 24. Consequently, the potential at junction E is initially a small negative potential. That is, the anode of diode 28 is at ground potential and a small voltage drop, for example 500 millivolts, exists thereacross. Therefore, the potential at junction E is represented by $-V_{d1}$, or $-500$ milivolts. This potential is sufficient to reverse bias the diode 20 whereby no output signal current exists.

With the application of input signal A, reverse current initially flows in diode 14 (rather than diode 26) since the reverse impedance of diode 14 is less than the total impedance of diode 26 and resistor 24. When the diode 14 switches, as shown at dashed line 54 and described supra with reference to FIGURE 2, the potential at junction B rises sharply to a substantially positive value. Inasmuch as diode 26 has charge stored therein, a reverse current exists therein. This reverse current continues until the charge is swept out of the diode 26. The time period of this reverse current is represented by $\Delta T_2$. After the time period $\Delta T_2$, the charge stored in diode 26 has been removed. Therefore, diode 26 appears as an open circuit and there is no current flow therethrough. Inasmuch as there is no complete circuit, the potential at junction E drops to ground potential. The ground potential remains at junction E until the input signal A supplied at terminal 10 has been removed and forward current flows through diode 26 again whereby the potential at junction E drops to $-V_{d1}$.

The output signal which is detected at point F of the circuit is initially at ground potential. That is, diode 20 is initially reverse biased by the $-V_{d1}$ potential at the anode thereof whereby no current exists in the circuit and there is no voltage drop across load 22. With the switching of the potential at junction B, due to the application of an input signal A by source 10, diode 26 conducts reverse current. Therefore, the potential at junction E rises sharply. Because of the high conduction and high speed characteristic of diode 20, the waveshape at point F substantially follows the potential at junction E. Therefore, the potential at point F rises sharply. When the diode 26 ceases to conduct and becomes an effective open circuit, the potential at point E drops to ground potential as described supra. This potential is insufficient to maintain conduction in the diode 20. Therefore, the diode 20 becomes an open circuit and the potential at point F reverts to ground potential.

Thus, it may be seen that regardless of the leading or trailing edges of the input signal A, a very fast, sharp, leading edge is supplied to the output signal F because of the fast snap action switching of diode 14. Similarly, the fast snap action switching of diode 26 provides a high-speed, sharp, trailing edge to the output signal F. Thus, the output signal has extremely fast sharp, rise and fall times. In addition, by controlling the recovery time of diode 26, the duration, $\Delta T_2$, of the output signal F may be controlled. This type of signal and signal control is highly desirable in many operations. Therefore, it is seen that the circuit provides a reshaping and reforming pulse generating circuit.

In addition to the obvious advantages which have been discussed, including the single pulsing feature of the circuit, modifications may be made thereto which will provide similar advantages in slightly modified uses if desired. For example, a tank circuit may be connected in parallel with the storage diode 14 in order to store energy therein during the switching of the diode which stored energy may then be released subsequently to provide a flatter top to the output signal if the input signal is supplied by a sine wave generating circuit. These and other modifications and alterations may be made to the circuit without altering the inventive principles recited hereinabove. In addition, the modifications which may appear to those who are skilled in the art are meant to be included within these inventive principles and concepts as defined in the appended claims.

The embodiments of the invention in which an exclusive property or privilege is claimed are defined as follows:

1. A pulse shaping circuit comprising, first and second diodes exhibiting charge storing characteristics, bias means connected to said first and second diodes to produce forward current therein in order to cause the storage of charge in said first and second diodes, input signal supplying means connected to said first and second diodes for producing reverse current therein until the charge stored therein is removed, means connected between said first and second diodes so that said diodes conduct reverse current at different times, and output means connected to said diodes.

2. In combination, a first diode exhibiting charge storage characteristics, a second diode exhibiting charge storage characteristics, impedance means connected between said first and second diodes, first rectifier means connected between said first and second diodes, bias means connected to said first and second diodes to create forward current therein so that charge may be stored therein, said forward current in said second diode passing through said first rectifier means and limited by said impedance means, load means, second rectifier means connected to said load means and said second diode, said second rectifier poled so that only reverse current through said second diode is applied to said load means, and input means connected to said first and second diodes for supplying a signal which produces reverse current therethrough, said first and second diodes having reverse current therein at different times only.

3. A pulse shaping and generating circuit comprising first and second diodes which exhibit charge storage characteristics, bias means for applying a forward current to said first and second diodes such that charge is stored therein, load means, first and second rectifiers which do not exhibit charge storage characteristics, said first rectifier connected in series with said bias means and one of said first and second diodes, said load means connected in series with said second rectifier, said second rectifier and said load means connected in series with said second diode, input means connected to said first and second diodes, said input means capable of selectively applying signals which cause reverse current in said first diode until the charge stored therein by said forward current is removed whereupon said first diode becomes nonconductive and reverse current is applied to said second diode and said load until the charge stored in said second diode by said forward current is removed whereupon said second diode becomes nonconductive.

4. A pulse shaping circuit comprising, first and second diodes exhibiting charge storing characteristics, first and second unilaterally conducting devices, bias means connected to said first and second diodes and said first unilaterally conducting device to produce forward current therein in order to cause the storage of charge in said first and second diodes, input signal supplying means connected to said first and second diodes for producing reverse current therein until the charge stored therein is removed, means connected between said first and second diodes so that said diodes conduct reverse current at different times, and output means connected to said diodes via said second unilaterally conducting device such that current is supplied to said output means only when said second diode has reverse current conduction therein, said second unilaterally conducting device being normally reverse biased by said bias means.

5. In combination, a first diode exhibiting charge storage characteristics, a second diode exhibiting charge storage characteristics, variable impedance means connected between said first and second diodes, first rectifier means connected between said first and second diodes, bias means connected to said first and second diodes to create forward current therein so that charge may be stored therein, said forward current in said second diode passing through said first rectifier means and limited by said impedance means such that the forward current and charge storage in said second diode may be controlled, load means, second rectifier means connected to said load means and said second diode, said second rectifier poled so that only reverse current through said second diode is applied to said load means, and input means connected to said first and second diodes for supplying a signal which produces reverse current in said first diode until the charge stored therein is removed whereupon said second diode has reverse current therein until the charge stored therein is removed, said second rectifier means passing current to said load means only while said second diode is conducting reverse current.

6. The pulse shaping and generating circuit recited in claim 3 wherein said first rectifier and the diode connected in series therewith are connected in parallel with the other diode, and said second rectifier and series connected load means are connected in parallel with said first rectifier.

References Cited by the Examiner

UNITED STATES PATENTS

| | | | |
|---|---|---|---|
| 2,737,601 | 3/56 | McMahon | 307—88.5 |
| 3,070,779 | 12/62 | Logue | 307—88.5 |
| 3,132,259 | 5/64 | Magleby | 307—88.5 |
| 3,134,028 | 5/64 | Jensen | 307—88.5 |

OTHER REFERENCES

International Solid-State Circuits Conference, Feb. 21, 1958, "Diode Amplifiers," by H. W. Abbot et al., pages 57–59.

Proceedings of the IRE, January 1962, "P-N Junction Charge-Storage Diodes," by J. L. Moll et al., pages 43–51.

ARTHUR GAUSS, *Primary Examiner.*